United States Patent
Jacobs

(10) Patent No.: US 6,483,200 B1
(45) Date of Patent: Nov. 19, 2002

(54) ELECTRICAL CABLE SYSTEM FOR TRUCK TRACTOR CABS WITH SLEEPER BOXES

(75) Inventor: John D. Jacobs, Brea, CA (US)

(73) Assignee: R. A. Phillips Industries, Inc., Santa Fe Springs, CA (US)

( * ) Notice: Subject to any disclaimer, the term of this patent is extended or adjusted under 35 U.S.C. 154(b) by 0 days.

(21) Appl. No.: 09/579,652

(22) Filed: May 26, 2000

Related U.S. Application Data
(60) Provisional application No. 60/136,716, filed on May 28, 1999.

(51) Int. Cl.$^7$ .................................................. B60L 1/00
(52) U.S. Cl. ...................................... 307/10.1; 307/9.1
(58) Field of Search .................................. 307/9.1, 10.1

(56) References Cited

U.S. PATENT DOCUMENTS

| | | | | |
|---|---|---|---|---|
| 4,092,034 A | * | 5/1978 | Becker | 280/420 |
| 4,124,815 A | * | 11/1978 | Stoschek | 325/51 |
| 5,100,336 A | | 3/1992 | Burgess et al. | |
| 5,306,037 A | * | 4/1994 | Robertson | 280/495 |
| 5,393,242 A | * | 2/1995 | VanDerStuyf | 439/364 |
| 5,725,228 A | * | 3/1998 | Livingston | 280/414.1 |
| 6,007,346 A | * | 12/1999 | Gutierrez et al. | 439/35 |
| 6,054,779 A | * | 4/2000 | Zubko | 307/10.8 |
| 6,121,551 A | * | 9/2000 | Dobrow | 174/113 R |

FOREIGN PATENT DOCUMENTS

| CA | 2297883 | * | 12/2000 | H02J/1/08 |
|---|---|---|---|---|

OTHER PUBLICATIONS

Surface Vehicle Standard SAE, J560, Rev. Jul. 1998, Society of Automotive Engineers, Inc., Warrendale, PA.
International Standard (ISO) 3731, International Organization for Standardization, Geneva, Switzerland, Jul. 1980.
Phillips Industries Catalog (CAT 197), front and back covers and pp. 6, 7, 11, 17, 18 & 19; published 1997.
Phillips Industries Catalog (CAT 100), front and back covers and pp. 6, 7, 9, 15 & 16; published 1999 after May 28, 1999.

\* cited by examiner

*Primary Examiner*—Fritz Fleming
(74) *Attorney, Agent, or Firm*—Christie, Parker & Hale, LLP

(57) ABSTRACT

An electrical wiring system is described for providing required and other electrical signals and functions between a truck tractor and a trailer coupled for towing to the tractor. The tractor has an operator cab and may include a sleeper compartment (box) behind the cab. The wiring system provides efficiencies in manufacture of the tractor, particularly when it includes a sleeper box which the tractor manufacturer may offer in a range of lengths. The wiring system includes a cable module for the cab and a standard-length cable module for the sleeper box. The cab cable module terminates at its rear end in a connector to which can be connected either a socket assembly for a removable tractor-to-trailer cable unit having end connectors conforming to an applicable Standard, or a connector at the forward end of the sleeper box cable module, or a tractor-to-trailer cable unit which is more permanently connected to the tractor. The rear end of the sleeper box cable module terminates in a connector which can be a duplicate of the connector of the cab cable module.

12 Claims, 5 Drawing Sheets

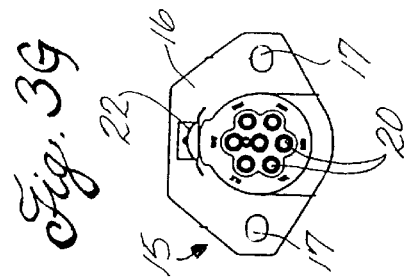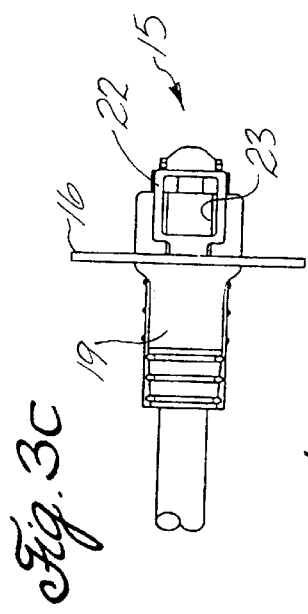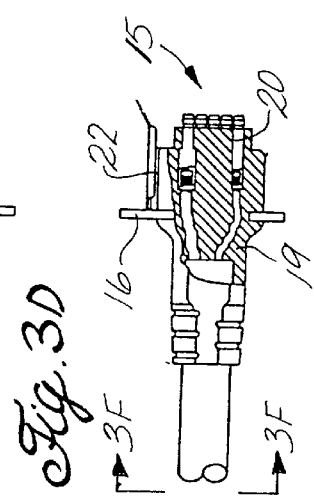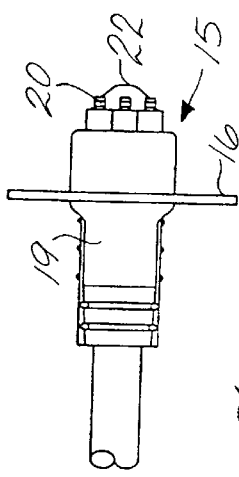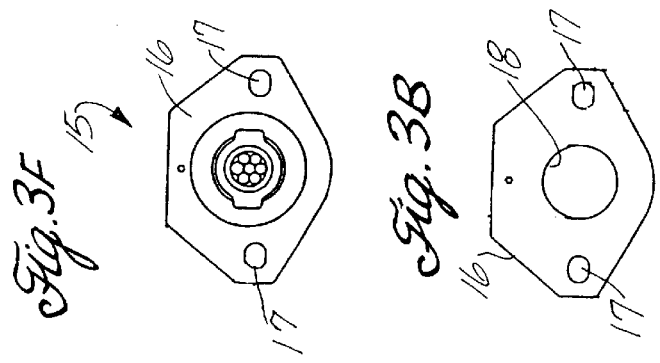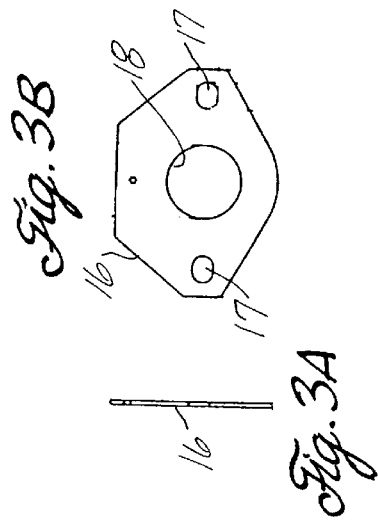

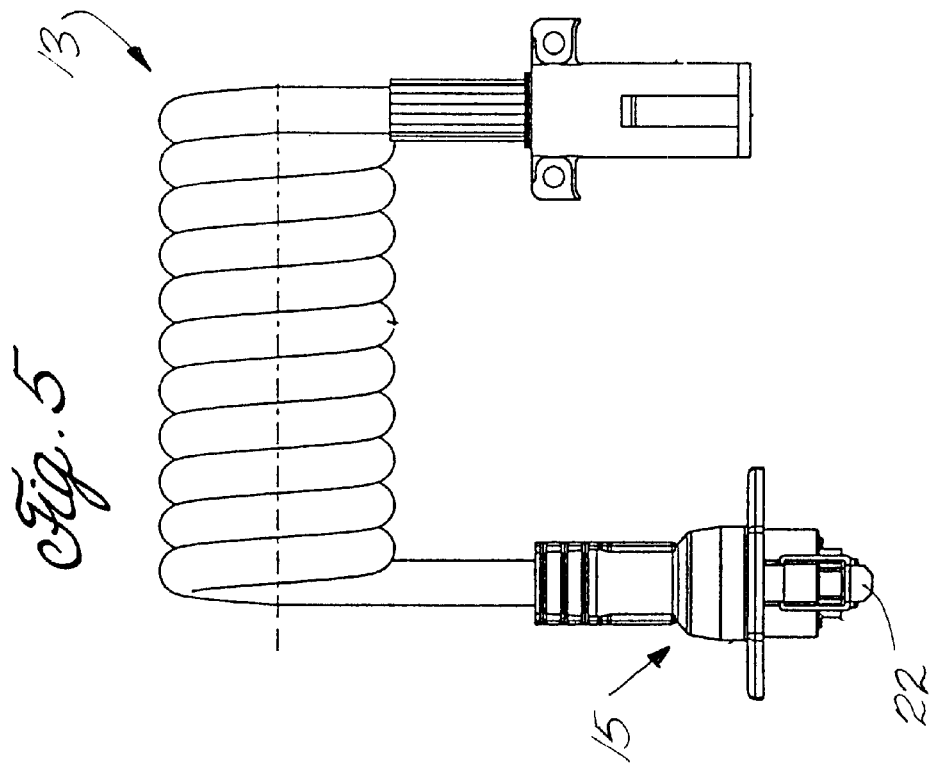

ELECTRICAL CABLE SYSTEM FOR TRUCK TRACTOR CABS WITH SLEEPER BOXES

This application claims the benefit of U.S. Provisional Application No. 60/136,716, filed May 28, 1999.

FIELD OF THE INVENTION

This invention pertains to heavy duty truck tractors which may incorporate sleeper boxes. More particularly, it pertains to arrangements for more efficiently providing certain electrical wiring configurations in such tractors as manufactured with and without sleeper boxes, including the wiring cables and connectors between a tractor and a trailer.

INCORPORATION BY REFERENCE

Attached hereto as Appendices A and B are respectively Standard SAE J560 and Standard ISO 3731, each of which is incorporated by reference hereinto.

BACKGROUND OF THE INVENTION

Heavy duty truck tractors are manufactured with and without sleeping spaces. A tractor made without a sleeping space in comprised of a basic cab structure mounted on a basic chassis. A tractor made with a sleeping space is comprised of a basic cab structure and a sleeping compartment (commonly called a "sleeper box") mounted on an extended chassis. In either case, one or more electrical outlets are provided on the exterior rear wall of the cab or the sleeper box, as appropriate. Those outlets can be made in conformance with SAE (Society of Automotive Engineers) Standard J560 as amended from time to time, last in June 1993. Those outlets receive plugs which conform to the same SAE Standard. Those plugs typically are provided at the opposite ends of a multi-wire electrical cable which is used to establish desired electrical connections between the tractor and a trailer coupled to the tractor.

Another standard pertinent to electrical interconnections between tractors and trailers of heavy duty trucks is gaining acceptance in the United States. That other standard is ISO (International Standards Organization) 3731. Connectors conforming to Standard SAE J560 are not matable to connectors conforming to Standard ISO 3731. Therefore, the outlets provided at the rear wall of the cab or sleeper box can be outlets conforming to ISO 3731. In some instances, tractors are being manufactured with parallel SAE J560 and ISO 3731 electrical cable systems, in which event both SAE J560 and ISO 3731 outlets are provided in the cab or sleeper box rear wall by the tractor manufacturer. Because each tractor manufacturer, at any given time, builds its tractors with a basic cab structure conforming to a highly standardized design, it is common for each manufacturer to use a standard, easily stocked, prefabricated wiring harness to form the electrical connections between a power distribution panel in the tractor and the outlet at the rear face of the tractor cab. Sleeper boxes, however are offered in different sizes (lengths) by the different tractor manufacturers.

It is known that tractor manufacturers do not know or address the issues presented by sleeper boxes until late in the tractor manufacturing process. The sleeper box is treated as an add-on to an extended chassis behind the cab. When a sleeper box is added behind the cab, the rear wall of the sleeper box becomes the place where the outlet for the tractor-to-trailer cable needs to be located. Heretofore, tractor manufacturers needed to stock separate cab harnesses, of different lengths related to the different lengths of sleeper boxes offered by the manufacturer, to make the connection from the tractor power distribution panel to the outlet on the sleeper box rear wall. That practice requires a part member for each different wiring harness. That complicates the tractor manufacturer's inventory requirements and "supply to the line" problems for the manufacturer. Those problems include possible delays in the operation of the tractor assembly line.

Tractor manufacturers desire to stock only a minimum number of parts to provide electrical connections to a trailer regardless of whether the tractor includes a sleeper box and regardless of the length of the sleeper box.

This invention addresses and meaningfully satisfies that desire. It does so by providing a coordinated set of tractor cable modules, in the minimum number consistent with the tractor manufacturer's need to satisfy customers' requirements, useful to build a full range of tractors with and without sleeper boxes of different lengths. The module set is comprised of a cab cable module, a sleeper box module useful with sleeper boxes of different lengths, a disconnectible tractor-to-trailer cable module subset having two different types of cables, and a tractor-to-trailer cable module subset, of the same two different types, in which each cable is essentially permanently connected to the tractor. The two different types of tractor-to-trailer cables are straight and coiled.

DESCRIPTION OF THE DRAWINGS

The presently preferred electrical connection modules, their components, and their cooperative relations are shown in the accompanying drawings wherein:

FIGS. 3A–G, composed of views 3A through 3G, shows details of the plug end of the cable module shown in FIG. 2;

FIG. 5 is a plan view of a coiled (i.e., self-coiling) tractor-to-trailer permanent cable with connectors, denoted 13 at IV in FIG. 1.

DESCRIPTION

Figure 1:
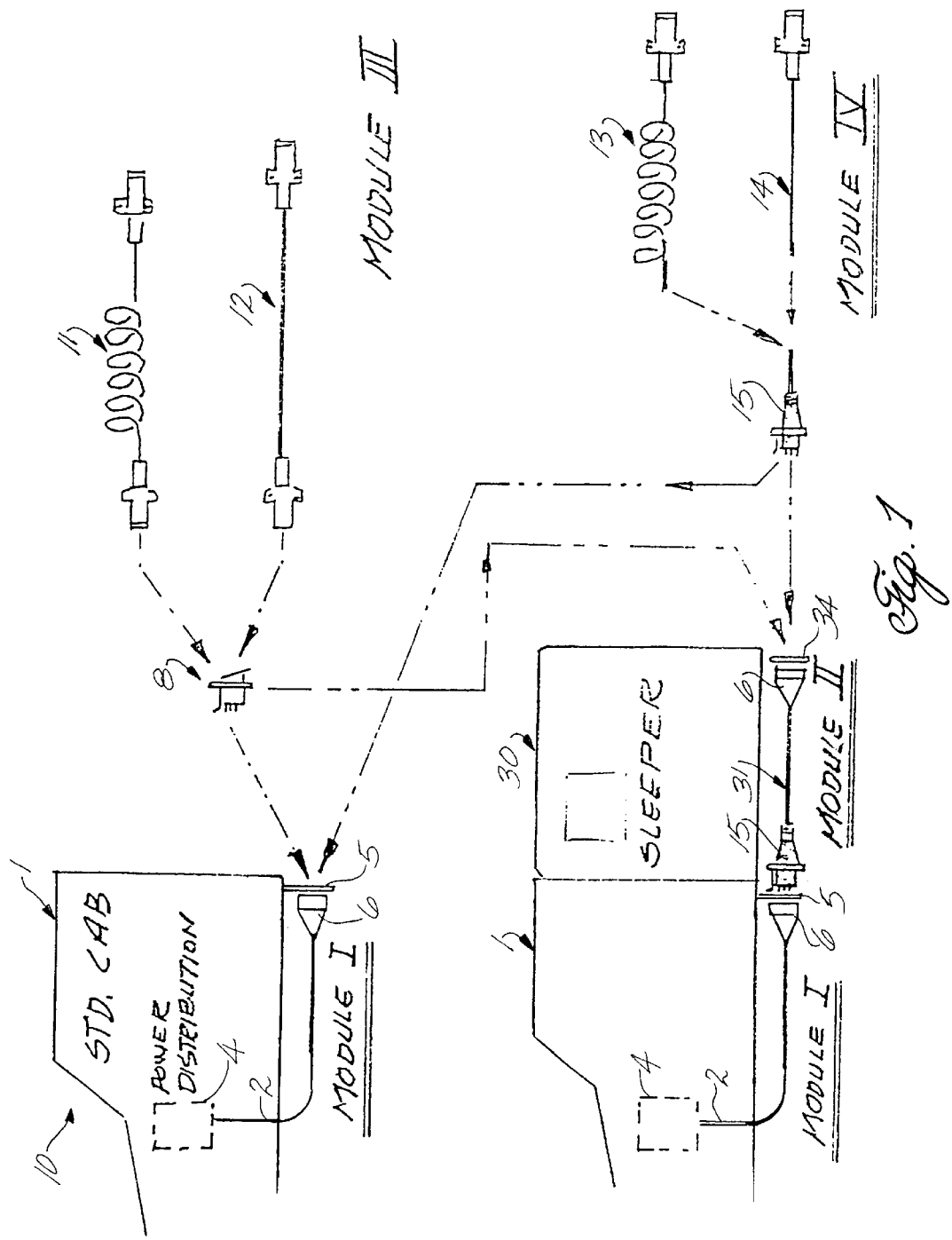
FIG. 1 generally illustrates the four cable modules, and their sub-types, and shows how they can be used in different combinations in and with truck tractors built with and without sleeper boxes.

FIG. 1 is an overall system depiction of the electrical cables and their connectors of this invention. FIG. 1 shows how the cables define four different Modules I, II, III and IV, how they can be interconnected in different ways, their relations to cab and sleeper box portions of a heavy duty truck tractor, and the different types or styles in which Modules III and IV can be provided. The principal users of the cable assemblies of Modules I, II and IV are manufacturers of heavy duty truck tractors. The cable assemblies of Module III are used by such manufacturers and by operators of such tractors when replacements of originally installed cables assemblies are needed; the same is true, likely to a lesser extent, of the cable assemblies of Module IV.

Except as noted below, the following description of this invention is set forth with reference to cable assemblies which have connectors which are fully conforming to Standard SAE J560 or which substantially conform to that standard. It will be understood that the principles and teachings of this invention are readily applicable to, and can be implemented in the context of cable assemblies having connectors which conform to ISO 3731. Therefore, on a mutatis mutandis basis, the following description is pertinent to tractors having cable assemblies conforming only to ISO 3731. It follows that this invention also is applicable to tractors having both SAE J560 and ISO 3731 trailer connection capabilities in parallel. The products of Phillips Industries which are mentioned below, unless stated otherwise, are products which recognize and conform to SAE J560. In the manufacture of the cab 1 of a truck tractor 10, a given manufacturer can use a Module I cable assembly 2 in substantially all cabs being made during a given year. That is true because, as noted above, tractor manufacturers produce highly standardized cabs at any given time, usually a model year. Cable assembly 2 is connected from a cab power distribution panel 4 to a mounting location 5 at or closely adjacent to a rear wall of cab 1. The connector 6 at the rear end of cable assembly 2 preferably is of the kind provided in the cable end plugs of part numbers 16-7401 and 16-7421 as currently manufactured and sold by Phillips Industries, Santa Fe Springs, Calif. 90670; those products formerly had part numbers 16-740 and 16-742. Those connectors have seven female electrical terminals which are connected to respective different conductors in the cable; the terminals are disposed in an array which conforms to SAE Standard J560 which is applicable and adhered to throughout the heavy duty truck industry in the United States and, as a practical matter, also in Canada and Mexico. The overall connector 6, however, need not conform to that standard because the connector is within the structure of the cab and that standard pertains to electrical connections between a tractor and a trailer. Phillips part numbers 16-7402 and 16-7422 are the ISO counterparts of part numbers 16-7401 and 16-7421.

As shown in the upper portion of FIG. 1, the connector 6 of cable assembly 2 can be mated to an SAE J560 conforming socket 8 mounted to the rear surface of the cab at location 5. That can be the case where the customer for the tractor desires to use one of the removable tractor-to-trailer cable assemblies 11 or 12 (Module III) such as are commercially available from Phillips Industries as part numbers 30-9320, 22-7050, or 32-9320, e.g. (coiled cables 11) and as part numbers 30-2030 or 22-2011, e.g. (straight cables 12). Those cable assemblies terminate at each end in a plug conforming to SAE J560. Socket 8 can be a Phillips part number 15-720, 15-721, 15-722, e.g., but a Phillips socket of the type provided by part numbers 16-7401 and 16-7421 is preferred. Phillips socket part number 16-822 is ISO version of the socket of part number 15-720.

Connector 6 is a female connector. The portion of socket 8 with which it is matable is the functional rear end of the socket, which is the same as the actual front end of the socket as mounted to cab 1 with its SAE J560 conforming socket facing to the rear of the tractor cab. The portion of socket 8 which conforms to the governing standard, SAE or ISO, is commonly called the front of the socket when the socket as such is the topic of attention. However, in the context of a tractor cab, that functional front end is actually the rear of the socket as the socket is mounted to the tractor.

On the other hand, if the customer for tractor 10 prefers a tractor-to-trailer cable assembly which is not readily removable from the cab at a socket 8, but prefers a cable assembly which is significantly more permanently connected to the cab, then the cab can be provided without socket 8. In that event, the tractor is delivered to the customer equipped with the one of permanently connected tractor-to-trailer cable assemblies 13 (coiled) and 14 (straight) which has been requested by that customer.

Coiled cable assembly 13 and straight cable assembly 14 are two of the kinds of permanently connected tractor-to-trailer cable assemblies provided by this invention and which comprise Module IV of the tractor cabling system of this invention. A Module IV cable assembly includes novel aspects of this invention and was not a commercially available product before the occurrence of the present invention, although it has some features in common with commercially available cable assemblies 11 and 12. The novel features of cable assemblies 13 and 14 are found in the connector 15 at the front end of each of those assemblies. Those novel features are shown in the several views of FIG. 3. Views 3C, 3D and 3E of FIG. 3 are respectively top plan, side elevation (partially in section), and bottom plan views of connector 15, while views 3F and 3G are respectively rear and front end elevation views of the connector. Views 3A and 3B are side and front views of a coupling flange plate 16 which is a component of the connector.

Coupling flange plate 16 has two holes 17 formed through it on either side of a central hole 18. The sizing and spacing of holes 17 conform to the mounting hole specifications of SAE J560 which are applicable to a socket such as socket 8. Plate 16 is incorporated into a body 19 of connector 15; that body preferably is molded of a synthetic resin material such as polyvinyl chloride and the body preferably is molded around the plate and around the conductors and terminals of the connector in a known way. As noted above, there typically are seven conductors in the cable of a Module III or a Module IV cable assembly. Accordingly, each cable conductor extends into body 19 where it is securely connected to one end of a male connector terminal pin 20, the other end of which extends from an end face of the body. The several terminal pins are sized and arrayed relative to each other in conformance with SAE J560. It will be recalled that the female terminals in connector 6 at the rear end of a Module I cable assembly also are sized and arrayed relative to each other in conformance with SAE J560 so that connector 6 is readily matable to the male terminals provided in socket 8. Therefore, connectors 6 and 15 are also matable with each other.

As shown in views 3C, 3D and 3G of FIG. 3, connector 15 includes a resilient locking clip 22 which preferably is connected to plate 16, such as by a rivet, and extends from the plate adjacent the exterior of body 19 toward the body end face from which terminals 20 project. Clip 22 has a preferably rectangular hole 23 formed through it. That hole is sized and positioned to snugly receive a similarly sized locking lug 24 which in formed on the exterior of connector 6; see the left end of FIG. 2. As a consequence of the cooperative structural features of connectors 6 and 15, connector 15 of a cable assembly 13 or 14 can be bolted to cab mounting location 5 via its mounting holes 17 so that the end portion of connector 15 which carries terminals 20 extends through a central hole at location 5. As so mounted to location 5 in an essentially permanent manner, clip 22 of connector 15 lies on the forward side of location 5. Therefore, when connectors 6 and 15 are mechanically mated to each other, effective electrical connections between the respective terminals of the connectors are established, and lug 24 on the body of connector 6 is held captive in hole 23 of connector 15's locking clip 22. In a similar manner, if, as preferred, socket 8 also includes a locking clip like clip 22, the use of that preferred form of socket 8 at cab mounting location 5 enables connector 6 to be mated and locked to the forward part of the socket structure. If socket 8 does not include a clip 22, connector 6 still can be mated to and supported by the forward structure of the socket.

The foregoing descriptions have been presented in the context of the case where the tractor is to be manufactured and delivered without a sleeper box on the tractor chassis at the rear of the cab. The lower left portion of FIG. 1 shows the case where the tractor does include a sleeper box 30 at the rear of cab 1. It is in that situation that a Module II cable assembly 31 is used to advantage; see also FIG. 2. As noted above and as reflected in FIG. 2, tractor sleeper boxes are made available by tractor manufacturers in a range of sizes (lengths). While cable assembly 31 can be made available to and stocked by tractor manufacturers in different predetermined lengths, it is believed that individual tractor manufacturers will prefer to obtain and to stock cable assemblies 31 of one standard length which corresponds to the longest sleeper box which each offers. That choice simplifies matters greatly for the tractor manufacturers. If a long standard length cable assembly is used with a shorter sleeper box, the slack in the installed cable assembly is accommodated in an out-of-the-way place in the sleeper box, such as in the rear wall of the box or under the internal flooring of the box.

Figure 2:
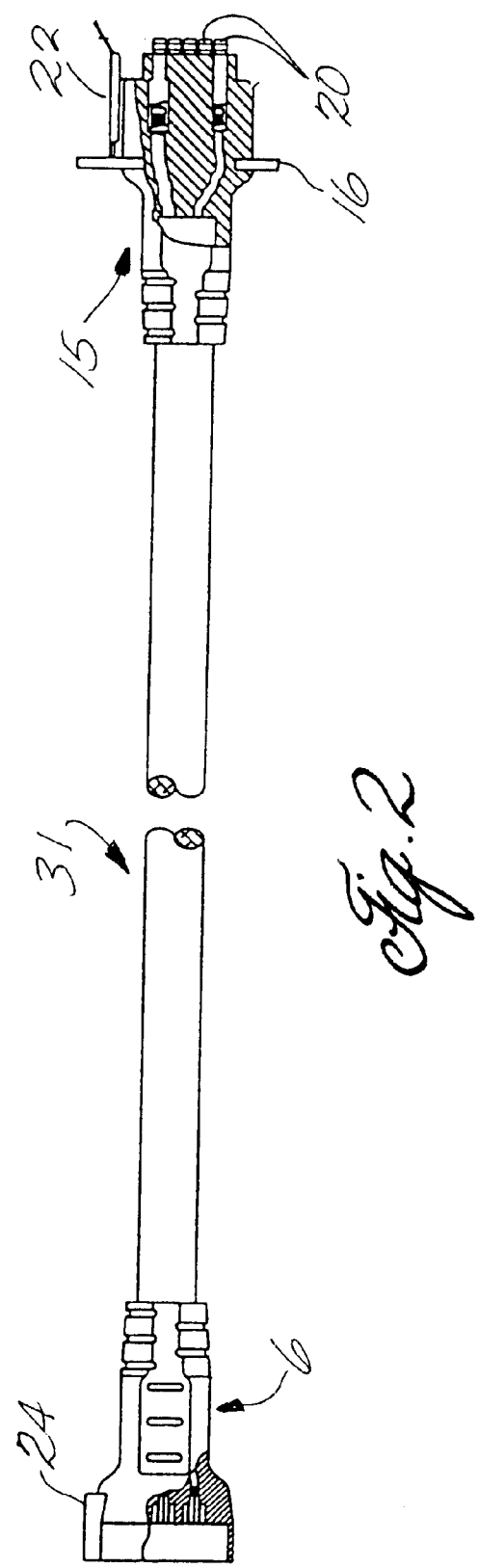
FIG. 2 is a plan view, partially in cross-section, of a sleeper box cable module denoted II in FIG. 1.
Figure 4:
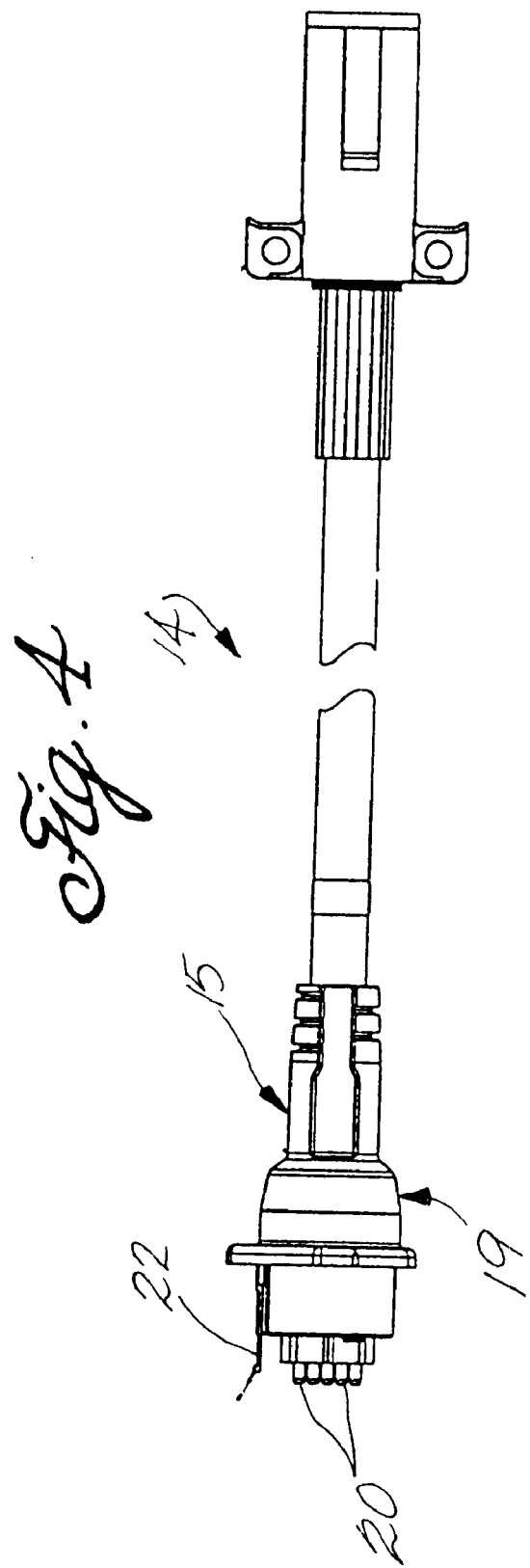
FIG. 4 is a plan view of a straight (i.e., not coiled) tractor-to-trailer permanent cable with connectors, denoted 14 at IV in FIG. 1.

As shown in FIG. 2, sleeper box cable assembly 31 is composed of a multi-conductor electrical cable 32 of selected length. One end of the cable terminates in a connector 6 as described above, and the other end of the cable terminates in a connector 15 as described above. That cable assembly is used in association with a mounting location 34 in the rear wall of the sleeper box. Cab mounting location 5 and sleeper box mounting location 34 can be identical save for where they are found in the completed tractor. Connector 15 of a Module II cable assembly is connectible, as through a port in the forward wall of a sleeper box, to the rear end connector 6 at cab mounting location 5. It will be seen that the foregoing descriptions about the connectability of a socket 8 and one of cable assemblies 11 and 12 to cab mounting location 5, and the alternate connectability of one of cable assemblies 13 and 14 to location 5 are descriptions which are equally applicable to sleeper box mounting location 34.

Experience has shown that it is the connector plugs at the rear ends of tractor-to-trailer cable assemblies which are far more likely than the front end plugs (connectors) to be damaged and to require replacement. Also, if such a cable assembly is removably connected to a tractor via a socket 8, it is subject to being stolen or lost in various ways. Therefore, the essentially permanent connection of cable assemblies 13 and 14 to a cab or to a sleeper box 30, via connectors 6 and 15, materially reduces the chance that the cable assembly will be lost or stolen. That essentially permanent connection does not interfere with the replaceability of the SAE J560 conforming plug at the rear end of the cable assembly, and effectively complies with the purpose of SAE J560. The purpose of Standard SAE J560 is to assure that any truck tractor can be electrically linked to any truck trailer.

Persons skilled in the art and industry to which this invention pertains will recognize that cable assemblies 2, 11 and 12 are known, and that cable assemblies 13, 14 and 31 are new. The combination of those known and new cable assemblies enables manufacturers of truck tractors to more efficiently produce tractors having no sleeper boxes and also tractors having sleeper boxes of different lengths. At the same time, they can offer to the purchasers of the tractors a new and wider range of tractor-to-trailer cable arrangements to better serve the interests of those purchasers.

What is claimed:

1. In a truck tractor having an operator cab mounted on a forward position of a tractor chassis and a sleeper box mounted on the chassis at the rear of the cab, an electrical wiring arrangement providing required electrical connections for a trailer which may be coupled to the tractor at the rear of the chassis behind the sleeper box, the wiring arrangement comprising a first multi-conductor cable connectible to an electrical connection panel in the cab and terminating at a rear end thereof in a first connector of generally female type which includes a terminal for each respective cable conductor and which is fixed to and opens rearwardly from the cab, and a second multiconductor cable of standard length terminating at one end in a second connector of generally male type connectible to the aforesaid first connector and terminating at its other end in a third connector of generally female type which is similar to the aforesaid female first connector, and which is mounted in a rear portion of the sleeper box to open rearwardly therefrom.

2. The structural combination according to claim 1 in which the third connector is available to connect to a socket assembly having a receptacle for a plug of a tractor-to-trailer electrical cable.

3. The structural combination according to claim 2 in which the receptacle and associated portion of the socket assembly conform to Standard SAE J560.

4. The structural combination according to claim 2 in which the receptacle and associated portion of the socket assembly conform to ISO Standard 3731.

5. A truck tractor sleeper box wiring assembly comprising a multiconductor electrical cable of standard length terminating at its opposite ends in respective first and second connectors providing terminals for respective ones of the cable conductors, the first connector being of overall male type and available at a forward end of the assembly to be connected to a mating connector in a truck tractor cab, the second connector being of overall female type and available to be mounted at a rear wall of a tractor sleeper box.

6. Apparatus according to claim 5 in which one of the first and second connectors includes a resilient locking clip releasably engageable with a connection moiety with which that connector is matable.

7. Apparatus according to claim 6 in which the locking clip is carried by the first connector.

8. Apparatus according to claim 5 in which one of the first and second connectors carries an external lug available to be engaged by a resilient locking clip carried by a connection moiety with which that connector is matable.

9. Apparatus according to claim 8 in which the lug is carried by the second connector.

10. Apparatus according to claim 5 further including a tractor-to-trailer electrical cable having front and rear ends, the front end of that cable terminating in a connector configured for mating with the aforesaid second connector, the rear end of that cable terminating in a plug conforming to an applicable Standard.

11. Apparatus according to claim 10 in which the Standard is SAE J560.

12. Apparatus according to claim 10 in which the Standard is ISO 3731.

* * * * *